United States Patent [19]

Hilbrink

[11] Patent Number: 4,769,767
[45] Date of Patent: Sep. 6, 1988

[54] MEMORY PATCHING SYSTEM

[75] Inventor: Johan O. Hilbrink, Cincinnati, Ohio

[73] Assignee: NCR Corporation, Dayton, Ohio

[21] Appl. No.: 567,486

[22] Filed: Jan. 3, 1984

[51] Int. Cl.<sup>4</sup> .......................... G11C 11/34; G06F 7/00
[52] U.S. Cl. ...................................... 364/200; 364/174
[58] Field of Search ... 364/200 MS File, 900 MS File; 365/174; 381/53

[56] References Cited

U.S. PATENT DOCUMENTS

| | | | |
|---|---|---|---|
| 4,019,175 | 4/1977 | Nakao et al. | 364/900 |
| 4,064,490 | 12/1977 | Nagel | 364/200 |
| 4,115,853 | 9/1978 | Dummermuth | 364/200 |
| 4,130,730 | 7/1982 | Ostrowski | 381/53 |
| 4,400,798 | 8/1983 | Francis et al. | 365/174 |
| 4,403,303 | 9/1983 | Howes et al. | 364/900 |
| 4,422,144 | 12/1983 | Johnson et al. | 364/200 |
| 4,498,151 | 2/1985 | Henry | 364/900 |

FOREIGN PATENT DOCUMENTS 0048816  4/1982  European Pat. Off. .

OTHER PUBLICATIONS

E.D.N., vol. 28, No. 21, Oct. 1983, A. J. Morales et al., "Adding EEPROM to ROM expands IC Versatility", pp. 177-188.

Primary Examiner—Gary V. Harkcom
Assistant Examiner—Randy W. Lacasse
Attorney, Agent, or Firm—Wilbert Hawk, Jr.; Robert L. Clark; Jack R. Penrod

[57] ABSTRACT

A data processing system comprising a central processing unit, a read-only memory, a changeable read-only memory and a read-write memory. A resident computer program is stored in the read-only memory, and instructions corresponding to program changes are stored in the changeable read-only memory. The program is assembled, revised and stored in the read-write memory from which the revised program can then be executed by the central processing unit. Other or further program revisions may be made by changing or reprogramming the changeable read-only memory.

1 Claim, 6 Drawing Sheets

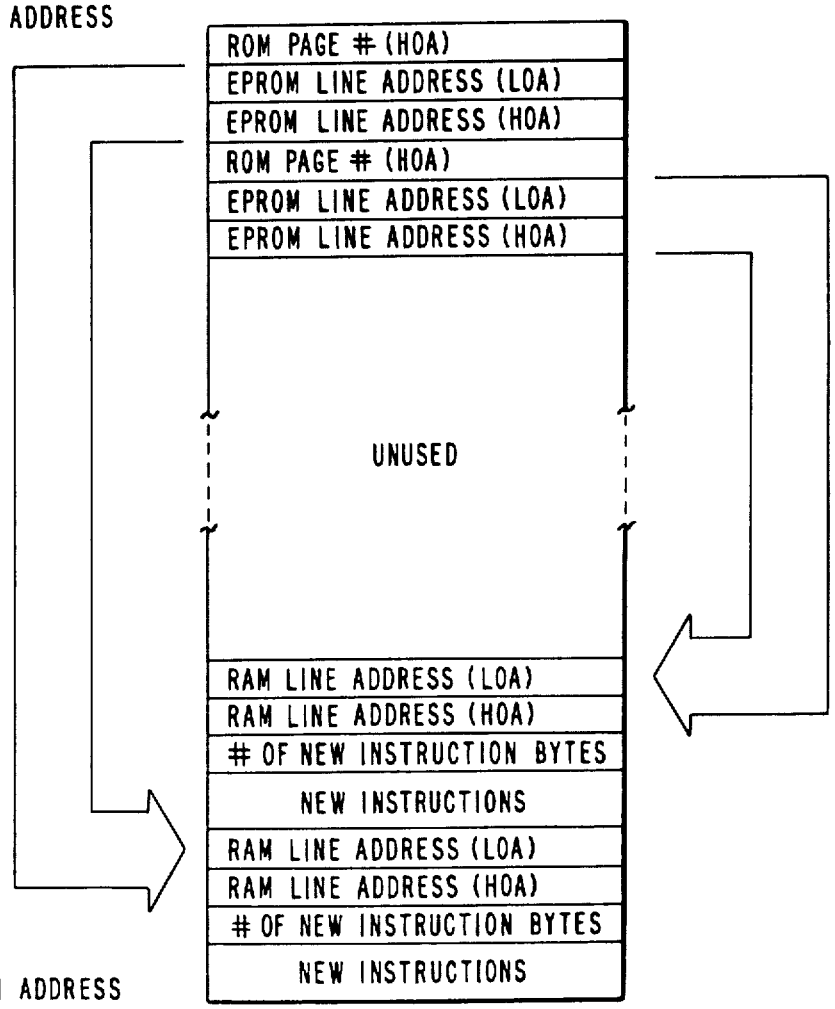
FIG. 4 ROM I/O TABLE
FIG. 5 EPROM MEMORY MAP

RAM MEMORY MAP

LOW ADDRESS

HIGH ADDRESS

MEMORY PATCHING SYSTEM

BACKGROUND OF THE INVENTION

This invention relates to data processing systems of the type having a read-only memory in which a resident computer program is stored. More particularly, the invention relates to a data processing system having a central processing unit capable of executing such a program.

Data processing systems are generally provided with at least one central processing unit (CPU) that includes circuits which control the interpretation and execution of instructions in a computer program. Such systems conventionally have a computer memory or information storage facility, and may also have input-output channels, control units, and one or more connected input-output devices.

The computer memory is used to store information which is accessible to the central processing unit. The stored information may represent text or numerical data to be operated upon or otherwise processed, or it may represent instructions of a computer program.

Computer memories are of various conventional types. For example, a memory is said to be "volatile" if the stored information is lost upon shutdown of the main power supply and consequent loss of applied power. A "nonvolatile" memory is one in which the information is stored permanently and is not dependent upon applied power for its retention. A volatile memory may be made "quasi-nonvolatile" by backing up the main power supply with an auxiliary supply source such as a battery.

Computer memories may also be dynamic or static in nature. A dynamic memory is one which permits the internally stored information to be accessed. Dynamic memories typically use integrated capacitors as storage elements. A static memory is one in which specific internally stored information remains stored at a fixed physical location and is continuously accessible at that location. Integrated flip-flop circuits are typical storage elements used in static memories.

Stored information may be accessed by random access in some computer memories, while in other memories it must be accessed by serial access. A random access type memory is one in which the time it takes to access stored information is independent of the physical internal memory location at which the information is stored. Serial access requires that stored information be accessed sequentially until the desired information is accessed.

Most semiconductor memories in current use are of the random access type.

One category of computer memory is the read-write type memory. A read-write memory is one in which the internally stored information may be accessed and read and also modified by the central processor unit. The mnemonic RAM is generally used to denote read-write memories which are of the random access type. Semiconductor read-write memories are generally volatile, are of the RAM type and may be static or dynamic in nature.

The read-only memory is another conventional basic type of computer memory. A read-only memory is one in which the stored information may be accessed and read but not modified by the central processor unit. The mnemonic ROM is generally used to denote a read-only type memory in which the stored information is represented by firmware which is fixed by masking in the process of manufacture and cannot be altered. ROM type memories are thus nonprogrammable and are used for permanent information storage within a data processing system.

The mnemonic PROM is used to denote another type of read-only memory. Semiconductor PROM type memories may generally be programmed one time after manufacture. They are typically programmed by blowing integrated electrical fuses at selected internal locations, and once information has been stored by the programming it cannot thereafter be altered.

The mnemonic EPROM is used to denote a readonly type memory which is programmable and also erasable or alterable. A semiconductor EPROM may be of the type which is erasable electronically, or of the type which is erasable by exposure to ultraviolet light. Semiconductor EPROM type memories may be programmed and erased and reprogrammed by the knowledgeable user or programmer using equipment which is relatively inexpensive and readily available.

Using the current complementary metal oxide semiconductor (CMOS) technology, high capacity ROM type memories are becoming available at relatively low cost. For example, 512 kilobit CMOS ROM type memories are now being made available by Sharp Company. The cost per unit of storage capacity is about 1/5 of that for volatile RAM type memories, and about 1/10 of that for alternative nonvolatile semiconductor memories. Other companies have projected availability in the near future of large nonvolatile ROM chips having 1M bit to 4M bit capacities. At the present state of microelectronics technology, the newer high capacity semiconductor memory circuits are more economical per bit than the available smaller capacity semiconductor devices, but are at the same time slower in terms of the time it takes to access stored information.

Read-only type memories have been conventionally used as permanent storage for resident computer programs for execution by the central processing unit. For example, utility programs such as bootstrap routines, operating system environment programs, loader or executive program routines and assembly language utility routines are often stored in and executed out of read-only type memories. Applications programs for applications such as word processing, accounting, inventory control and other user desired applications have also been stored in read-only type memories. The advantage to having resident programs available in permanent storage is that they may be instantly accessed by the user upon power up, thus avoiding the time and expense of the alternative by which programs are accessed and downloaded from auxiliary storage such as peripheral tape or disk drive units.

It is also conventional to load and assemble computer programs in RAM type memories and to have the central processing unit execute the programs out of RAM. For example, the program instructions may initially be stored in auxiliary storage such as on media in peripheral tape or disk drive devices. In such arrangements, the programs are accessed and downloaded by the central processing unit which then stores the programs in main storage of RAM type and causes the program to be executed out of RAM. The operation is typically carried out by the central processing unit under control of a utility program called an executive program which is stored in and executed out of a read-only type memory.

Peripheral storage devices for storing computer programs have the disadvantage of high initial cost and time and trouble to the user in connection with accessing and downloading computer programs. They have the advantages, however, of convenience and low cost of making available additional programs as well as updates and corrections to old programs.

With the availability of the newer high capacity ROM type memories, the advantage will be seen in increasing use of this type of media to provide applications or function programs to the user. At the same time, expedient and low cost means will be needed for updating and correcting to such programs, as well as for making new programs available. As it is, the relatively low cost of semiconductor ROM memories is keyed to their mass production, and as mentioned, their programming must be carried out by the manufacturer and cannot be performed in the field. Thus in most instances, it will be uneconomical to obtain customized high capacity ROM chips on a small scale basis. While the cost per unit storage capacity is comparatively low for mass produced high capacity CMOS ROM type memories, it should be noted that the cost per chip can be considerably higher than the cost for low capacity PROM or EPROM type memory chips and alternate low capacity media.

The following U.S. Patents are believed to be pertinent to the background of this invention and their respective disclosures and appended drawings are hereby incorporated herein by reference: U.S. Pat. Nos. 4,019,175, issued Apr. 19, 1977, to Nakao et al.; 4,064,490, issued Dec. 20, 1977 to Nagel; and 4,115,853, issued Sept. 19, 1978, to Dummermuth.

SUMMARY OF THE INVENTION

According to this invention, a data processing system is provided which comprises a central processing unit and at least three computer memories, one of which is changeable and physically separate from the other two. The first memory stores instructions of a computer program executable by the central processing unit and is preferably of the read-only type. The second memory may be replaceable by a like memory unit, or may be changeable in that it is at any time programmable or reprogrammable for use within the system. The second memory is preferably of a programmable read-only type. The second memory stores instructions corresponding to changes to be made to the computer program stored in the first memory. The third memory is a read-write type memory. Means are provided for loading into the read-write memory instructions stored in the first memory, together with instructions stored in the second memory, to provide in the read-write memory the instructions of the computer program revised to reflect the desired changes. Once thus loaded, the revised computer program is executable by the central processing unit out of the read-write memory.

Accordingly, a data processing system is provided in which a resident computer program is stored in permanent or nonvolatile storage. This program may be readily corrected or enhanced, simply by providing a new or substitute changeable memory which contains appropriate instructions reflecting desired revisions. Preferably, the changeable memory is provided in the form of a nonvolatile semiconductor EPROM type memory which can be readily programmed by the user or available commercial programmer. In this manner, program revisions can be made available quickly and at low cost, and the cost of replacing all manufactured read-only memories and the delays associated with obtaining replacements for such memories can be avoided.

Loading of the revised computer program into the read-write memory and initiation of its execution may be carried out by the central processing unit under control of a loader or executive utility program stored and executed out of a nonvolatile system memory.

One object of this invention is to facilitate revisability of resident computer programs in storage for execution by a data processing system.

Another object of the invention is to lower the cost and effort required to revise a resident computer program which is stored in a nonvolatile memory for execution within a data processing system.

A further object of the invention is to provide for revision of a resident computer program by means of using replacement or supplemental instructions which are contained in a changeable or replaceable memory device separate from the system memory in which the computer program as originally written is stored.

Still another object of the invention is to provide for the modification of information stored in permanent nonvolatile storage in a data processing system by storing information representing the modifications in a changeable programmable read-only type memory separate from the system memory in which the computer program as originally written is.

Still another object of the invention is to provide for modification of the information stored in nonvolatile storage in a data processing system by storing supplemental or replacement information in a changeable programmable read-only type memory which has substantially less storage capacity and is less costly to provide in a programmed state than the memory in which the information as initially provided is stored.

BRIEF DESCRIPTION OF THE DRAWINGS

In the appended drawings:

FIG. 1 represents a schematic for an external multi-memory circuit of a data processing system in accordance with the presently preferred embodiment of the invention;

FIG. 4 is a table showing the input states for the functions implemented to access and read information stored in the 512K bit ROM circuit shown in FIG. 1;

FIG. 5 is a memory map indicating exemplary information stored in the EPROM circuit shown in FIG. 1;

DETAILED DESCRIPTION OF THE PRESENTLY PREFERRED EMBODIMENT

Figure 1:
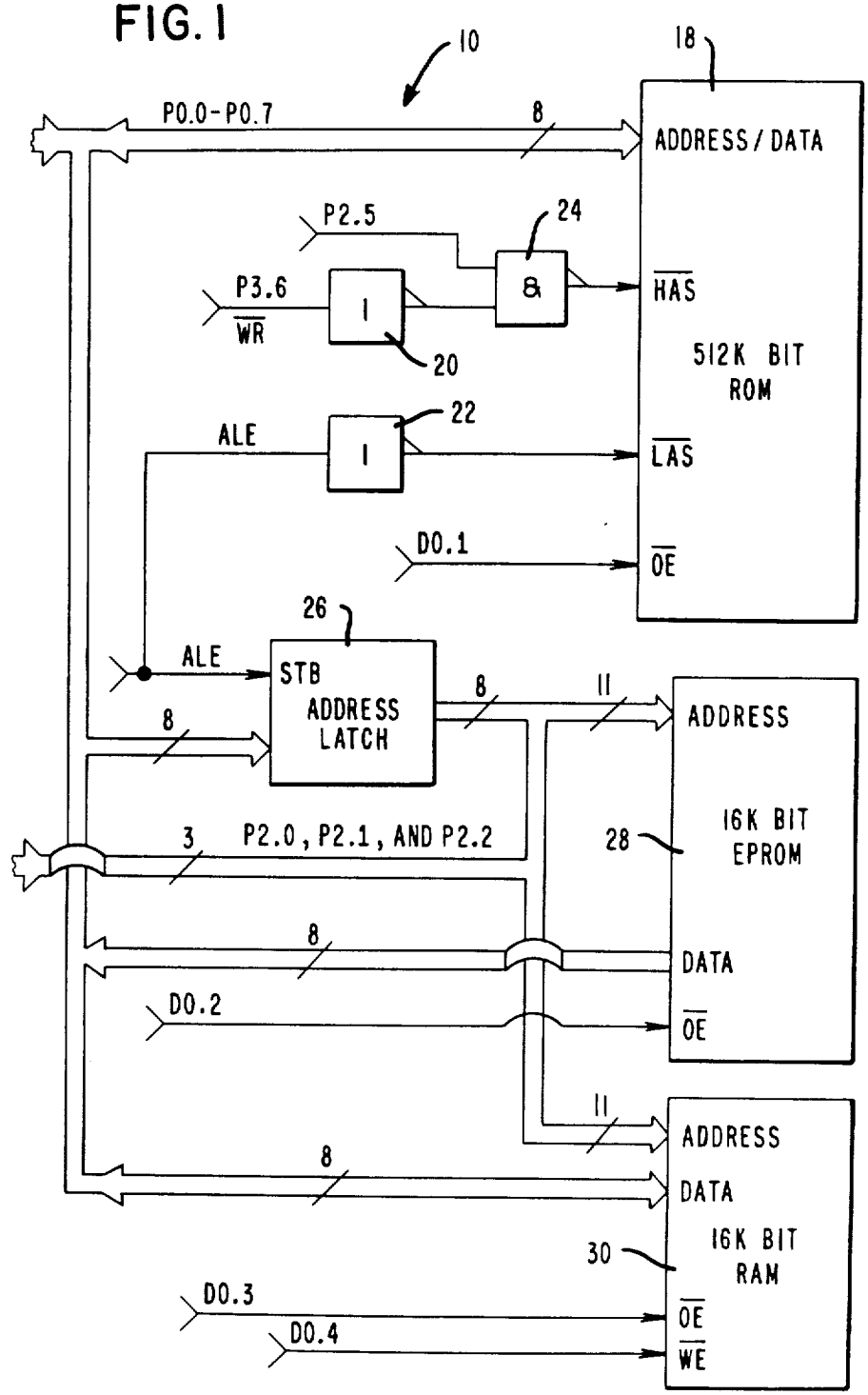
FIG. 1 represent
Figure 1A:
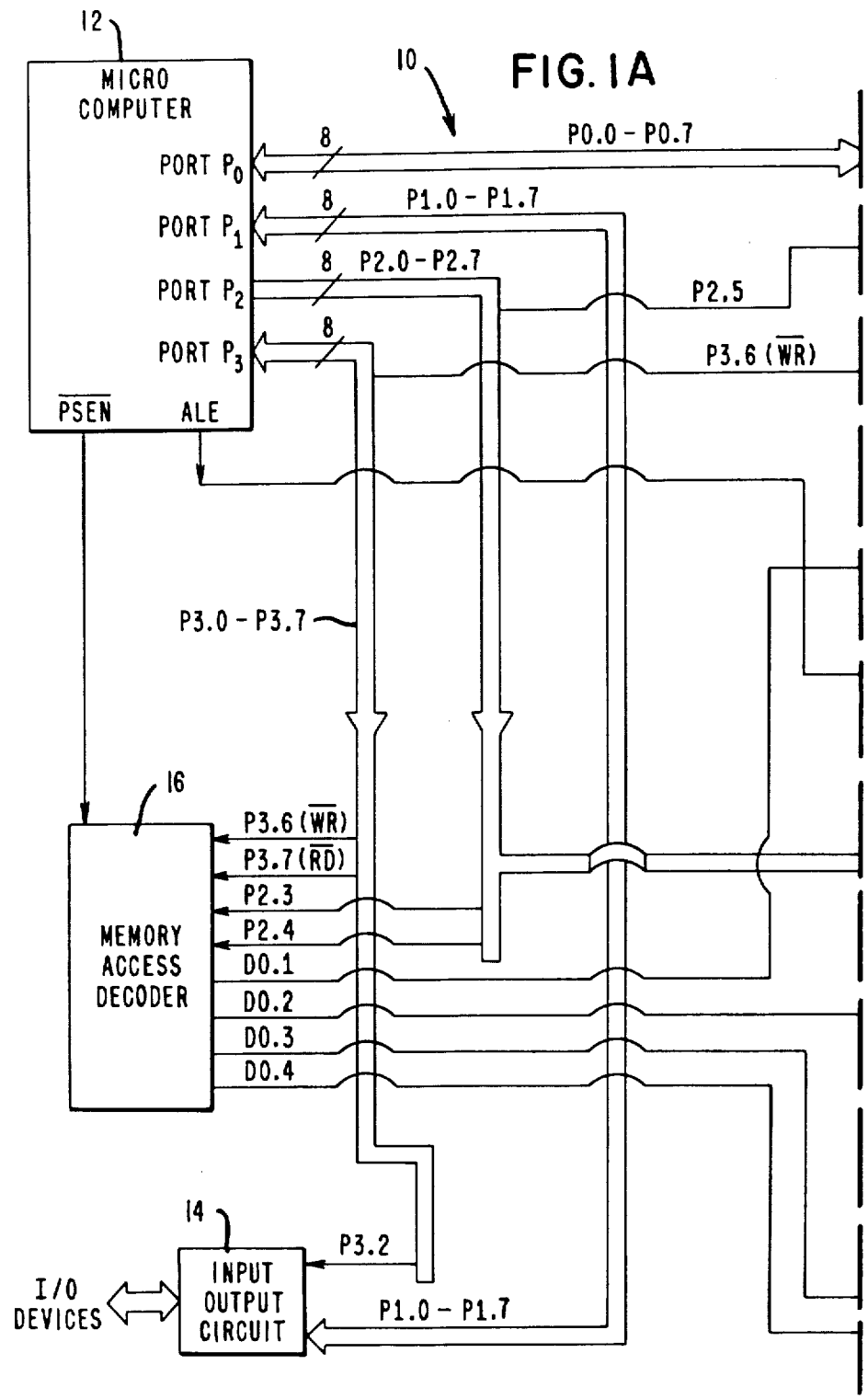
Figure 2:
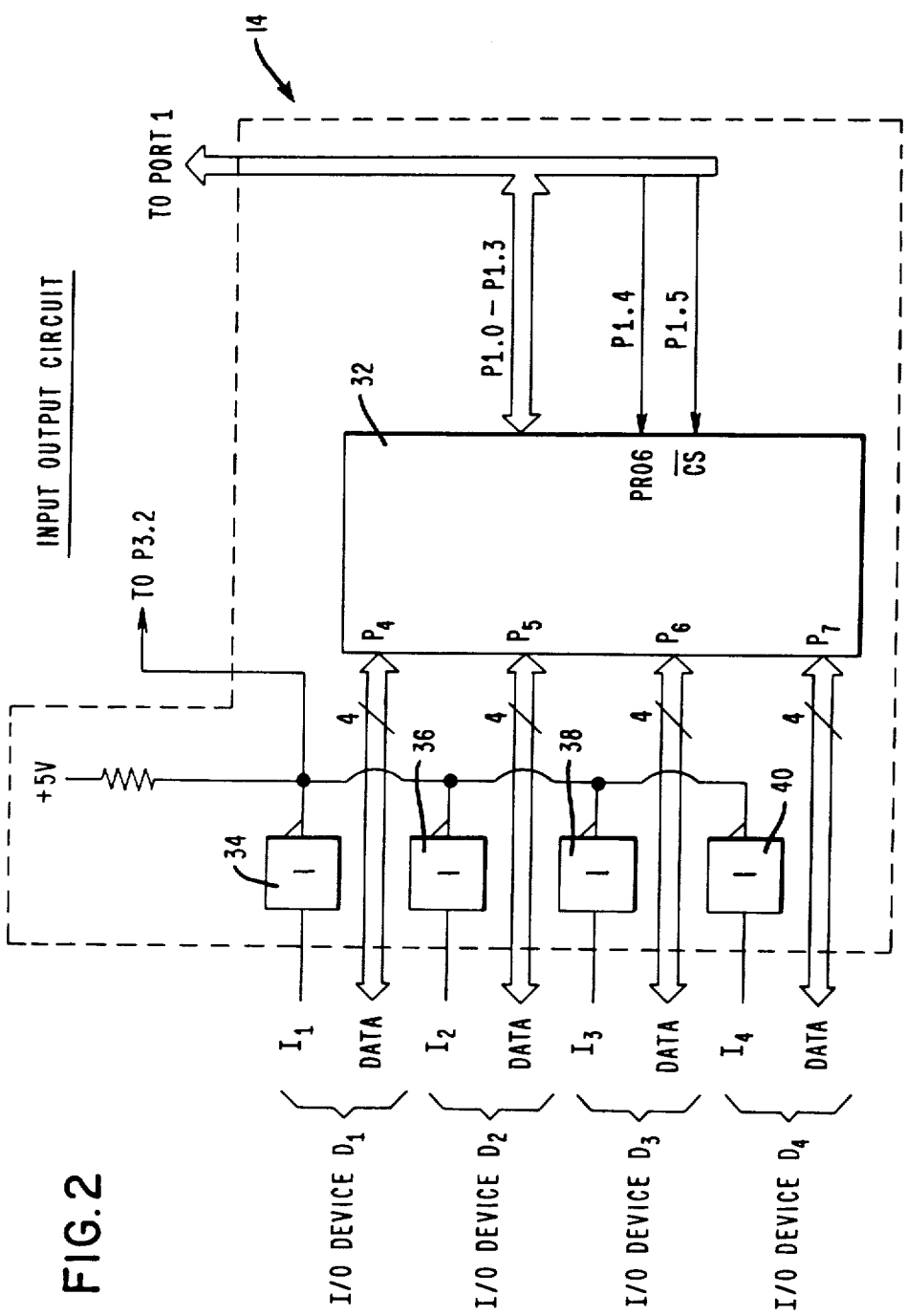
FIG. 2 is a schematic for an input-output circuit.
Figures 3A, 3B:
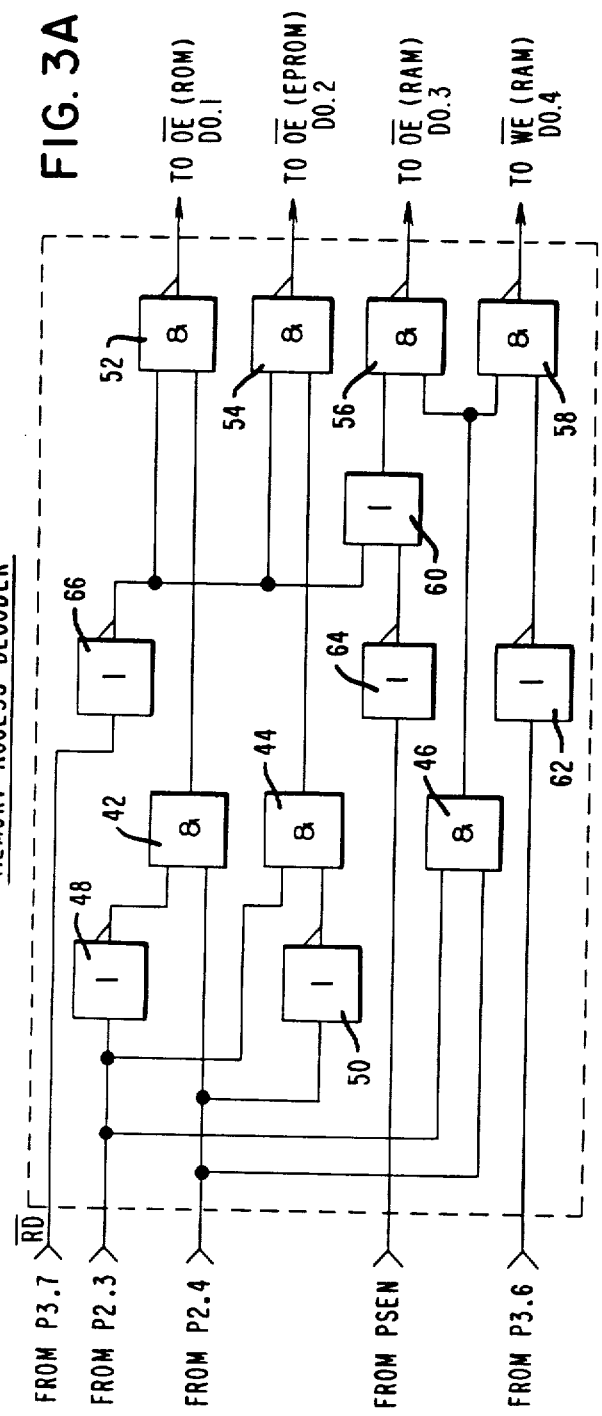
FIG. 3A is a schematic for a memory access decoder circuit.
FIG. 3B is a truth table for the memory access decoder circuit shown in FIG. 3A.

FIGS. 1, 2, and 3A together show a schematic for a data processing system 10 in accordance with the presently preferred embodiment of this invention. The system is designed to make use of very large scale integrated (VLSI) circuits. The system comprises a microcomputer (not shown), an input-output circuit 14 (see FIG. 2), a memory access decoder 16 (see FIG. 3A), a ROM type read-only memory 18, inverter circuits 20 and 22, NAND gate 24, an address latch 26, a changeable EPROM type read-only memory 28 and RAM type read-write memory 30 (see FIG. 1).

The microcomputer is preferably an 8-bit, single-chip computer which provides for interrupt control and has provisions for expansion and control of I/O and external memory. The preferred microcomputer contains a central processing unit (CPU), a nonvolatile 4K×8 read-only type internal program memory, a volatile 128×8 readwrite type internal data memory, and as shown in FIG. 1 it has four 8-bit I/O ports P0 thru P3. The Intel ®8051 microcomputer made by Intel Corporation is a commercially available microcomputer having these same specifications, and may be used to implement the presently preferred embodiment of this invention as illustrated in the appended drawings and described herein. Accordingly, reference is made to the "MCS-51 Family of Single Chip Microcomputers User's Manual", published and currently made available by Intel Corporation, 3065 Bowers Avenue, Santa Clara, Calif., 95051.

In operation, the microcomputer employs port P0 as a multiplexed low-order address and data bus when using external multi-memory circuit 10 of FIG. 1. At the beginning of each external memory access cycle, port P0 first outputs an 8-bit low-order address and then clears for input or output of 8-bits (one byte) of data over bus lines P0.0 thru P0.7 (see FIG. 1).

Port P1 is an 8-bit I/O port which functions as a multiplexed address and data bus when using the input-output circuit 14 (see FIG. 2). As configured in this exemplary embodiment, the four lines P1.0 thru P1.3 are employed as the bus. Line P1.4 is used to provide a clock input to the input-output circuit 14 to signify the character of information which is on the four-line bus. Lines P1.6 and P1.7 are unused but could be employed together with Line P1.5 to enable and select any one of a group of input-output circuits which might be connected for expanded I/O capabilities.

Port P2 of the microcomputer is an 8-bit I/O port which emits a high-order 8-bits of address when accessing external multi-memory 10. An shown in FIGS. 1, the three liens P2.0 thru P2.2 are used to provide a 3-bit high-order address for accessing EPROM 28 or RAM 30. The EPROM 28 and the RAM 30 each require an 11-bit address which is composed of an 8-bit low-order address portion and a 3-bit high-order address portion. The signals carried on lines P2.0 thru P2.2 are immaterial for purposes of accessing the ROM 18. The two lines P2.3 and P2.4 (see FIG. 3A) carry the "address" bits which are provided as inputs to the memory access decoder 16 for selecting which external memory is to be accessed. Line P2.5 (see FIG. 1) is used to carry a high level signal to enable toggling of a high-order address byte into the ROM 18 when access is made to that memory device. Lines P2.6 and P2.7 are not used.

Port 3 is an 8-bit I/O port which is used for various purposes of control. Line P3.2 is used to carry an interrupt signal from the input-output circuit 14 to the microcomputer. Line P3.6 (see FIG. 1) is used to carry the write control signal ($\overline{WR}$) which is output by the microcomputer. The write control signal is used to latch a data byte from port P0 into Ram 30 when that device is selected for a write operation. The write control signal is also used to latch a high-order "address" byte from port P0 into ROM 18 (see FIG. 1) in a manner which will be discussed below in greater detail. Line 3.7 (see FIG. 3A) is used to carry a read control signal ($\overline{RD}$) which is output by the microcomputer to indicate that it is ready to read a data byte from external multi-memory circuit 10 through port P0. The read control signal is used to toggle the selected external data memory device to enable data output from the selected device. Lines P3.0, P3.1, and P3.3 and P3.5 are unused.

The microcomputer has two additional output pins which need to be mentioned. The first such pin is for output by the microcomputer of an address latch enable (ALE) signal. The address latch enable signal is used to latch the 8-bit low-order memory address when access is made to any of the external memory devices for operations involving data input or output (see FIG. 1). The second such pin is used to carry the program store enable ($\overline{PSEN}$) signal (see FIG. 3A) which is output by the microcomputer to enable output of computer program instructions onto lines P0.0 thru P0.7 by the RAM 30 when accessed as external program memory. (The $\overline{PSEN}$ signal is similar to the $\overline{RD}$ signal, except that the $\overline{PSEN}$ signal is used to toggle output of computer program instruction bytes whereas the $\overline{RD}$ signal is used to toggle the output of data bytes. The timing and duty cycles of $\overline{PSEN}$ and $\overline{RD}$ are typically different, and PSEN may pulse at twice the frequency of $\overline{RD}$.)

Reference is now made to FIG. 2 for further schematic detail of the input-output circuit 14. As shown, the input-output circuit 14 comprises an input-output expander circuit 32, four I/O devices D1 thru D4, four interrupt lines I1 thru I4, and four inverter circuits 34, 36, 38, and 40.

The input-output expander circuit 32 is a single-chip part which serves as a direct extension of the resident I/O facilities of the microcomputer and is accessed by computer program instructions which the microcomputer is programmed to execute. The input-output expander 32 has four 4-bit bidirectional static I/O ports P4 thru P7 for interfacing with peripheral devices. The expander circuit 32 also has a 4-bit bidirectional I/O port for interfacing with the microcomputer over lines P1.0 thru P1.3. The expander circuit 32 also has an input pin for receiving a clock input (PROG) signal from the microcomputer over line P1.4, and an input pin for receiving a chip select ($\overline{CS}$) input signal from the microcomputer 12 over line P1.5. Pin input-output expander circuit having these same specifications is Intel ® MCS-48 ® 8243 input-output expander made by and currently available through Intel Corporation. The Intel ® MCS-48 ® 8243 may be used to implement the presently preferred embodiment of the invention as described and illustrated herein, and accordingly reference is made to the "MCS-48 Family of Microcomputers User's Manual" for further information concerning that part.

In operation, the expander circuit 32 is enabled by low level $\overline{CS}$ input signal conveyed on line P1.5. When line P1.5 carries a high level signal the expander circuit 32 is inhibited from any change of output or internal status. Information available on lines P1.0 thru P1.3 is in the form of other address and control bits or data bits. A high to low transition on line P1.4 signifies that the information is for address and control, whereas a low to high transition on that line signifies that the information is data.

Ports P4 thru P7 are selected by address bits input to the expander circuit 32 on lines P1.0 and P1.1. P1.0 carries the least significant address bit and P1.1 carries the most significant address bit. A binary 0 on the two lines selects port P4, a binary 1 selects port P5, a binary 2 selects port P6 and a binary 3 selects P7. Lines P1.2 and P1.3 carry control bits. Line P1.2 carries the least significant control bit and line P1.3 carries the most significant control bit. A binary 0 carried on lines P1.2 and P1.3 selects a read mode, a binary 1 selects a first write mode, a binary 2 selects a second write mode and a binary 3 selects a third write mode.

Once in the read mode, the expander circuit 32 will upon a low to high transition of the PROG signal, output as data on lines P1.0 thru P1.3 the signal levels present at the selected one of ports P4 thru P7. Once in the first write mode, the expander circuit 32 will upon a low to high transition of the PROG signal output as data to the selected port the data which is then available on lines P1.0 thru P1.3. The second write mode is similar to the first write mode except that the expander circuit 32 OR's the new data with the last previous data and outputs the result to the selected port. The third write mode is similar to the second write mode except that the new data and the old data are ANDed rather than ORed.

The I/O devices D1 thru D4 may be any combination of compatible peripheral devices such as printers, auxiliary memory, remote terminals and any specific devices as may be adapted to suit a particular application.

Interrupt lines I1 thru I4 are provided for input of interrupt signals by devices D1 thru D4 respectively. Interrupt lines I1 thru I4 are respectively connected in series with inverter circuits 34, 36, 38 and 40, which are in turn commonly connected to line P3.2. An interrupt of the CPU of the microcomputer is initiated by a low level signal on line 3.2 and thus by high level signal on any of the interrupt lines I1 thru I4.

Reference is now made to FIG. 3A which shows schematic details of the memory access decoder circuit 16. The decoder portion of the circuit 16 can be made of a conventional manner using AND gates 42, 44 and 46, and inverter circuits 48 and 50. Inputs from lines P2.3 and P2.4 carry the high-order address bits by which the external memories are selected by the microcomputer. Line P2.3 carries the least significant address bit and Line P2.4 carries the most significant address bit. A binary 1 carried on the two address line selects the ROM 18, a binary 2 selects the EPROM 28 and a binary 3 selects the RAM 30.

Active (low ) signals carried on lines P3.6 and P3.7 and from the $\overline{PSEN}$ output pin of the microcomputer are passed through the memory access decoder circuit 16 to the selected external memory device. To accomplish this, the memory access decoder circuit 16 is provided with four AND gates 52 thru 58, an OR gate 60, and three inverter circuits 62 thru 66. By design of the microcomputer, the signals on lines P3.6 and P3.7 and at the output pin $\overline{PSEN}$ are always high unless active and no two of the signals will be active simultaneously. Since the RAM 30 is the only external memory device capable of write operations, the memory access decoder circuit 16 is designed so that active low signals carried on line P3.6 can only be passed through to the RAM 30 and then only when the RAM 30 has been selected. Similarly, since RAM 30 is the only external memory which will be used by the microcomputer as external program memory, the memory access decoder circuit 16 is designed so that signals from the $\overline{PSEN}$ output pin of the microcomputer can be passed through only to the RAM 30 and then only when the RAM 30 has been selected. Since all three of the external memory devices may be used as external data memory for read operations by the microcomputer, signals carried on line P3.7 can be passed through to any one of the three external memory devices which has been selected.

FIG. 3B shows a truth table which illustrates the manner of operation of the memory access decoder 16.

Reference is now made to the ROM 18 which is shown in FIG. 1. The ROM 18 is preferably a CMOS ROM having a 512K bit memory capacity which is configured in the format of a 64K × 8 addressable array. The LH53512 512K bit CMOS ROM manufactured by Sharp Company is a synchronous, static, poly-silicon gate, n-well CMOS ROM which meets these specifications and may be used to implement the presently preferred embodiment of the invention as described herein and illustrated in the appended drawings. Reference is accordingly made to the "LH53512 Technical Data" sheets published by and made available through Sharp Company for a more detailed description of the specifications for this part and its use.

The ROM 18 operates in an 8-bit output mode in which address and data bytes are multiplexed over the 8-line bus shown in FIG. 1. The ROM 18 is continuously enabled in an 8-bit output mode by maintaining its chip select input (not shown) at a high level and its B/D input (not shown) at a low level.

Before desired data may be read from the ROM 18 by the microcomputer, the ROM 18 must first be addressed. This requires input to the ROM 18 of two bytes or 16 bits total of address information. The two address bytes required are respectively referred to as the high-order address (HOA) byte and the low-order address (LOA) byte. For each high-order address byte latched into the ROM 18, there are 256 separate data byte locations which may be accessed by variation of the low-order address byte to be latched into the ROM 18. Fixing of the high-order address byte thus defines what will be referred to herein as a "page" of data byte locations in the ROM 18, where each page comprises 256 of such locations.

To latch in the high-order address byte into the ROM 18, the high-order address byte must be first be placed on the 8-line bus as an output through port P0 of the microcomputer. For the high-order address byte to be read by the internal high-order address latch of the ROM 18, a high level signal must be input to the $\overline{LAS}$ pin of the ROM 18, and a low level signal must be input to the $\overline{OE}$ pin of the ROM 18. Under these conditions, the high-order address byte on the 8-line bus is read when the $\overline{HAS}$ input pin of the ROM 18 is at a low level, and is latched into the ROM 18 by low to high signal transition at the $\overline{HAS}$ input pin of the ROM 18. These operative conditions are shown in the truth table illustrated in FIG. 4.

The high-order address byte is latched into the ROM 18 by causing the microcomputer to execute a "write" instruction to the ROM 18 as in a normal write to external data memory operation. In executing this instruction, the content of the low-order address byte output by the microcomputer through port P0 is immaterial. The write instruction addresses the ROM 18 by an output through port P2 of the microcomputer. This output should comprise a binary 0 on lines P2.3 and 2.4 and a high level signal on line P2.5. In this write operation, the signals carried on lines P2.0 thru P2.2, P2.6 and P2.7 will be immaterial. The write instruction "data" byte will be output through port P0 of the microcomputer and interpreted by the ROM 18 as the high-order address byte to be latched into the ROM 18.

Thus, the write instruction to be executed by the microcomputer will be written to what the microcomputer sees as a 16-bit address in which only the 12th, 13th and 14th address bits will be significant. The 12th and 13th address bits will correspond respectively to the signal outputs to be carried on lines P2.3 and P2.4, and the 14th address bit will correspond to the signal to be carried on line P2.5. The "data" byte to be written by the "write" instruction will be output by the microcomputer on port P0 and seen and latched in by the ROM 18 as the high-order address byte to be used in later accessing of data from the ROM 18. In the execution of the write instruction, the microcomputer will first output the low-order address byte through port P0. At this point the $\overline{WR}$ output of the microcomputer carried on line P3.6 will be at a low level. As shown in FIG. 1, the external multi-memory circuit 10 includes an inverter circuit 20 which inverts the signal carried on line 3.6 and outputs it as an input to NAND gate 24. The output of the NAND 24 is the input to the input pin $\overline{HAS}$ of the ROM 18. It should thus be seen that while the signal level on the line P3.6 is at a high level, the $\overline{HAS}$ input pin of the ROM 18 will be at a high level. The second input to the NAND gate 24, as shown in FIG. 2, will remain at a high level during the course of the write instruction, since the signal level carried on line P2.5 has been set high and the output of port P2 of the microcomputer remains essentially constant over the course of each external memory access operation cycle. Thus, during the course of the write instruction, the signal level at the $\overline{HAS}$-input of the ROM 18 will switch states as the signal level on line P3.6 changes states.

During execution of the write instruction, the operate enable ($\overline{OE}$) pin of the ROM 18 will remain at a high level thus preventing data from being output by the ROM 18 consistent with the truth table shown in FIG. 4. At the beginning of the write instruction cycle, the signal output of the ALE output pin of the microcomputer goes high and remains high until the low-order address byte output through port P0 becomes valid and remains valid for a period of time, after which the signal level at the ALE output pin transitions from high to low and remains low for the duration of the write instruction cycle. As shown in FIG. 1, the external multi-memory circuit 10 includes an inverter circuit 22 which inverts the signal level from the ALE output pin of the microcomputer and provides the inverter signal output as an input to the $\overline{LAS}$ input pin of the ROM 18. Thus, at the beginnng of the write instruction cycle, the input to the $\overline{LAS}$ pin of the ROM 18 goes low and remains low until the low-order address byte on the 8-line bus becomes valid for a period of time, and then transitions from a low to high state to latch the low-order address byte into the ROM 18 under the conditions indicated in the truth table shown in FIG. 4. For the next portion of the write instruction cycle, the microcomputer, by multiplexing, outputs through port P0 the "data" byte to be written. At this point in the cycle, the inputs to the $\overline{HAS}$ and $\overline{LAS}$ input pins of the ROM 18 are high and the signal level at the $\overline{OE}$ input pin of the ROM 18 is low. Once the "data" on the 8-line bus becomes valid the $\overline{WR}$ signal output by the microcomputer onto line 3.6 goes low, and thus the input to the HAS input pin of the ROM 18 goes low, and the signal levels are maintained for a period time while the "data" on the 8-line bus remains valid. The signal carried on line 3.6 transitions from low to high while the "data" is still valid and thus toggles the "data" into the ROM 18. The "data" is interpreted by and latched into the ROM 18 as a high-order address byte under the conditions indicated in the truth table found in FIG. 4. The ROM 18 will "remember" the high-order address byte which has been latched, and will apply that byte until changed for purposes of all subsequent external data memory accesses to the ROM 18.

Once the high-order address byte has been set in the manner described above, external data memory read operations may be conducted by the microcomputer in a conventional manner. Read instructions will be directed by the microcomputer to a 16-bit address in which only the first 8 bits and the 12th and 13th bits are significant. The first 8 address bits correspond to the low-order byte which is output by the microcomputer through port P0 at the beginning of each external data memory read cycle. The 12th and 13th bits correspond to the signals output through port P2 of the microcomputer for the duration of each cycle as the signals carried on lines P2.3 and P2.4. Since the $\overline{WR}$ signal of the microcomputer carried on line P3.6 will remain at a highlevel for the duration of each read cycle, the $\overline{HAS}$ input pin of the ROM18 will also remain at a high level during this cycle irrespective of the signal level carried on line P2.5. Thus the 14th address bit as well as address bits 9 thru 11, 15 and 16 are insignificant for purposes of the 16-bit addresses used by the microcomputer to access the ROM 18 in external data memory read operations.

With the high-order address byte set, data in the ROM 18 is read by the microcomputer as follows. At the beginning of the read cycle, the microcomputer outputs the selected low-order address byte through port P0, and this byte is latched into the ROM 18 under control of the ALE output pin signal in the same manner as previously described in connection with "write" instructions relative to the ROM 18. During the next portion of the read cycle, after the low-order address byte has been latched into the ROM 18, by multiplexing the microcomputer clears port P0 for data to be read in through that port over the 8-line bus from ROM 18. At this point the signal levels at the $\overline{HAS}$ and $\overline{LAS}$ input pins of the ROM 18 are high and remain high during the duration of the read cycle. When the microcomputer is ready to read the data in through port P0, it causes its $\overline{RD}$ signal output carried on line P3.7 to transition from a high to a low state. This signal level transition is passed by way of the memory access decoder circuit 16 to the $\overline{OE}$ input pin of the ROM 18 to thereby toggle the output of the selected data byte onto the 8-line bus by the ROM 18.

It should be kept in mind that very large read-only memories will generally be slower in access time than smaller memories made by a similar semiconductor manufacturing process. For example, the LH53512 512K bit CMOS ROM made by Sharp Company has an access time of 4.4 microseconds, from the leading edge of the last address strobe pulse (at pin $\overline{LAS}$ or $\overline{HAS}$) to the first time valid data can be made available on the 8-line output but. However, when operating the Intel ® 8051 microcomputer at high speeds, e.g., at a 12 MHz clock rate, it will complete an external data memory read cycle in about one microsecond. In order to operate the microcomputer at the highest possible speeds, it may thus be necessary to resolve any discrepancy between the data access time characteristic to the ROM 18 and the access time allotted during read cycles by the microcomputer. For example, to make use of the microcomputer under control of its highest clock rates, the following may be observed. When the ROM 18 is storbed at its $\overline{OE}$ input pin for data output, the ROM 18 initially outputs the data currently in its internal data register. This is the same data as was output as a result of the last previous access of the ROM 18. The data currently in the data register of the ROM 18 is output in a fraction of a microsecond after the ROM 18 receives a strobe at its $\overline{OE}$ pin. About one microsecond after the strobe, the ROM 18 outputs the new data byte presently being accessed. Accordingly, one may access the ROM 18 one time to set the desired data in the internal data register of the ROM 18, and then execute a second access at the same ROM 18 address to fetch the data. Data required during the first access would be ignored. To give the ROM 18 sufficient time to have the desired valid data in its internal data register, the microcomputer can be instructed to execute a series of "no operations" or "wait" cycles between the first and second access of the ROM 18. By this method, the desired data can be made available at port PO of the microcomputer in a fraction of a microsecond after the $\overline{OE}$ pin strobe during the second access of ROM 18, and the data read by the microcomputer during this second access will be valid. The need to access the ROM 18 twice and the need to implement "wait" cycles will of cource depend upon the clock rate selected to operate the microcomputer.

Reference is now again made to FIG. 1 and to the address latch 26 shown therein. The address latch 26 may be a conventional parallel 8-bit otal latch, such as the Intel ® 8282 bipolar octal latch which is made by and currently available through Intel Corporation. Reference is accordingly made to the "MCS-48 Family of Single Chip Microcomputer User's Manual" published by Intel Corporation for further specifications for that part and the manner of its use.

The address latch 26 is used to provide an 8-bit low-order address byte to the EPROM 28 and the RAM 30 for accessing those external memory devices. The low-order address byte is input to the address latch 26 over an 8-line bus as output through port P0 of the microcomputer. The address latch 26 is continuously enabled so that the input signals on the 8-line bus are latched in by a high to low transition in the signal input to input pin STB of the address latch 26. The signal input to the STB input pin is provided by the output pin ALE of the microcomputer. Once data is latched into the address latch 26, the data is output as buffered signals on the 8-line output bus of the address latch 26.

Referring still to FIG. 2, the EPROM 28 can be a 16K bit, single-component, static part in which storage capacity is configured in a 2K×8 array. The Intel ® 2716 EPROM manufactured by Intel Corporation meets these specifications and may be used to implement the presently preferred embodiment of the invention as described herein and illustrated in the appended drawings. The Intel ® 2716 part is erasable by ultraviolet light and electrically programmable in the field. Reference is made to the "MCS-48 Family of Single Chip Microcomputers User's Manual" published and currently made available by Intel Corporation for a further specification of the part and description of its manner of use.

It is intended that the EPROM 28 be replaceable within the system 10 by a like memory unit, or in the alternative that it is at any time programmable or reprogrammable for use within the circuit 10.

The EPROM 28 is addressable via an 11-bit address input bus as shown in FIG. 1. The first 8 bits of the 11-bit address are provided in the form of the low-order address byte which is output by the address latch 26. The other three address bits are provided as an output of port P2 of the microcomputer carried on lines P2.0, P2.1 and P2.2. To read data from the EPROM 28 the microcomputer uses a 16-bit address in which only the first 13 bits are significant. The eight least significant address bits are output by port P0 as a low-order address byte, and the next three significant address bits are provided as output at port P2 on lines P2.0 thru P2.3 as previously described, for the total of 11 address bits which are provided as input to the EPROM 28. The last two most significant bits of the 13 bit address are output through port P2 of the microcomputer over lines P2.3 and 2.4 as input to the memory access decoder 16 which selects the EPROM 28 for access.

Data is output by the EPROM 28 in the form of a data byte output onto an 8-line data output bus to be read by the microcomputer through port P0. A data byte is output by the EPROM 28 in response to a high to low signal level transition at its input pin $\overline{OE}$. The signal provided to the $\overline{OE}$ input pin of the EPROM 28 is the $\overline{RD}$ signal output of the microcomputer carried on line P3.7 and passed through to the EPROM 28 by the memory access decoder circuit 16. The data output of the EPROM 28 is the byte which was stored at the location designated by the 11-bit address signals which were present on the input address bus of the EPROM 28 at the time of the high to low signal level transition at the $\overline{OE}$ input pin. The EPROM 28 is made continuously enabled by maintaining a low level signal input to the chip enable input pin (not shown) of the EPROM 28.

The microcomputer commences a read cycle in the normal manner to fetch data from the EPROM 28. At the beginning of the cycle, a selected low-order address byte is output through port P0 and made available as input to the address latch 26. The selected high-order address byte is output through port P2 for the duration of the read cycle. The first three bits of the high-order address byte are presented to the EPROM 28 as the three most significant address bits at its 11-bit wide input address port. The next two most significant address bits output through port P2 of the microcomputer are passed to the memory access decoder 16 which in response gates the signal from the $\overline{RD}$ output pin of the microcomputer carried on line P3.7, so that the signal from the $\overline{RD}$ pin is provided as an input to the $\overline{OE}$ input pin of the EPROM 28. At the beginning of the read cycle, the input pin $\overline{OE}$ of the EPROM 28 is maintained at a high level state. After the low-order address byte has been a valid output of port P0 of the microcomputer for a sufficient period of time, the byte is strobed into the address latch 26 by the signal output of the ALE output pin of the microcomputer. As a result of the consequent 8-bit output of the address latch 26, the EPROM 28 has a valid and complete 11-bit address present at its 11-bit address input port. The signal levels at the 11-bit port of the EPROM 28 remain constant for the balance of the read cycle. After the low-order address byte output by the port P0 of the microcomputer has been latched into the address latch 26, the microcomputer clears port P0 and opens it for reading of data output by the EPROM 28. Thereupon, the signal level at the output pin $\overline{RD}$ of the microcomputer carried on line P3.7 transitions from high to low and toggles the output of data by the EPROM 28. After a sufficient of time for the data output of the EPROM 28 to be valid, the microcomputer 12 reads the data byte through port P0 and the read cycle is thus completed.

Reference is now made to the RAM 30 shown in FIG. 1 of the drawings. The RAM 30 is preferably a static, CMOS RAM having a 16K bit memory capacity where storage is configured in a 2K × 8 array format. A 16K bit RAM having these specifications is the HM6116P-4 single-component CMOS RAM made by and currently available through Hitachi. The HM6116P-4 part is suitable for use in implementing the presently preferred embodiment of the invention as described herein and illustrated in the appended drawings, and accordingly reference is made to the literature published and currently available through Hitachi for further specifications for the part and a description of its manner of use.

The RAM 30 operates in a fashion similar to the EPROM 28 and is addressed in the same manner. Data is read into the RAM 30 by a high to low signal level transition toggle at its input pin $\overline{WE}$. During external data memory write operations the $\overline{OE}$ input pin of the RAM 30 is maintained at a high level. During a write cycle, the RAM 30 reads in and stores a data byte which has been placed on its 8-bit wide I/O data bus through port P0 of the microcomputer. The data is stored in the location in the RAM 30 designated by the signal levels on its 11-bit wide address input bus at the time of the previously described toggling of the signal level at the input pin $\overline{WE}$ of the RAM 30.

Data is read from the RAM 30 in essentially the same manner as from the EPROM 28. When data is read from the RAM 30 in the course of external data memory read operations, data is output by the RAM 30 in response to a high to low signal level transition at its input pin $\overline{OE}$ as controlled by the signal from the $\overline{RD}$ output pin of the microcomputer carried on line P3.7. When computer program instructions are read from the RAM 30 for execution by the microcomputer, the process by which this is done is called an external program memory operation. When data is written to or read from the RAM 30 by the micocomputer, the process is called an external data memory operation. When computer instructions are read from the RAM 30, the $\overline{OE}$ input pin of the RAM 30 is driven by the signal output of the $\overline{PSEN}$ output pin of the microcomputer, whereas when data is read from the RAM 30 the $\overline{OE}$ input pin is driven by the $\overline{RD}$ output pin signal of the microcomputer which is carried on line P3.7. Computer program instructions are fetched from the RAM 30 at about twice the rate at which data is fetched from the RAM 30. Otherwise, information is exchanged between the RAM 30 and the microcomputer in external program memory operations in essentially the same manner as in an external data memory read operation.

In operation, the RAM 30 is continuously enabled by maintaining its chip select input pin (not shown) at a low signal level.

In accordance with this exemplary embodiment of the invention, the ROM 30 stores instructions of a computer program executable by the central processing unit of the microcomputer. This program will be referred to herein as the function program. Instructions corresponding to changes to be made to the function program are stored in the EPROM 28. The microcomputer operates under control of a second computer program which will be called the executive program. The instructions for the executive program are preferably stored and executed out of the internal read-only memory (not shown) of the microcomputer. Under control of the executive program, the microcomputer loads into the RAM 30 the function program instructions stored in the ROM 18, together with instructions stored in the EPROM 28, to provide in the RAM 30 the instructions of the function program revised to reflect the changes designated by the stored content of the EPROM 28. Once loaded into the RAM 30, the revised function program is executable by the central processing unit of the microcomputer. Execution of the revised function program may be initiated, for example, by an interrupt signal output originating from the input-output circuit 14.

FIG. 5 illustrates an exemplary memory map indicating the storage and organization of information in the EPROM 28. As shown, a directory is stored beginning at the low address in the EPROM 28. FIG. 5 illustrates two directory entries, with each entry comprising three bytes of directory information. The first byte of each directory entry is the ROM page number of high-order address in the ROM 18 where a designated page consisting of 256 bytes of instructions of the function program is stored. The page number identifies a page in the function program which is targeted for a change. The last two bytes in each directory entry correspond to the address in the EPROM 28 where the related new function program instructions are stored. As shown in FIG. 5, the new program instructions for the function program are stored in the high address portion of the EPROM 28.

Each group of new instruction bytes is preceded by three bytes of related information. The first of two of these three bytes correspond to the address in the RAM 30 where the original function program will be overwritten by a jump instruction commencing at that address. The third of the three bytes represents the total number of the new instruction bytes which follow, which number will be used by the executive program to determine how many bytes of new instructions to read out of the EPROM 28 for purposes of each function program change.

The microcomputer commences operations under control of the executive program by loading into the RAM 30 the function program instructions stored in the ROM 18 on a page-by-page basis. First, a write instruction is executed to set the high-order address byte for the ROM 18 and thereby designate the first page of the function program instructions to be transferred. Then, the microcomputer will perform an external data memory read operation to acquire from the ROM 18 the first byte of the 256 bytes of function program instructions stored on the designated page. The acquired byte will then be transferred to the low address in the RAM 30 by execution of an external data memory write operation performed by the microcomputer. This sequence of external data memory read and write operations can be repeated until all 256 bytes of function program instructions for the designated page have been transferred from the ROM 18 and stored sequentially in the RAM 30.

Figures 6A, 6B:
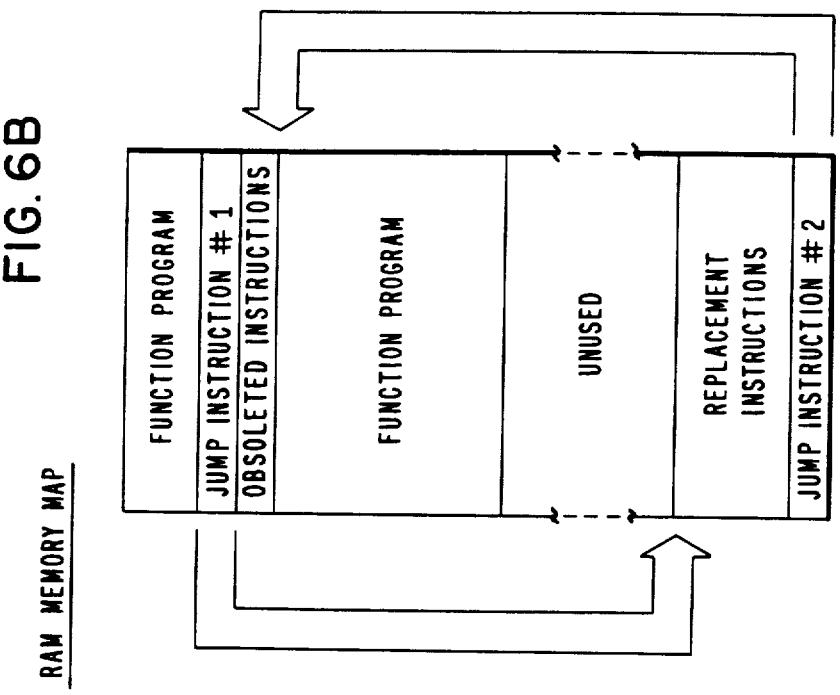
FIG. 6A is a memory map showing exemplary storage of a page (256 bytes) of the computer program instructions assembled and stored in the RAM circuit shown in FIG. 1.
FIG. 6B is a memory map showing an exemplary revision of the program page shown in FIG. 6A as stored in the RAM circuit shown in FIG. 1.

FIG. 6A illustrates an exemplary memory map for the RAM 30 indicating the location in storage of the first page of function program instructions which have been transferred from the ROM 18. At this point the microcomputer under control of the executive program commences a series of external data memory read operations to scan the directory beginning at low address memory in the EPROM 28. The first byte in each directory entry will be examined to determine if it matches the page number for the page just transferred from the ROM 18. If there is a match, the next two bytes in the directory entry are read by the microcomputer and are used as address information to access the corresponding new instructions which are stored in high memory of the EPROM 28. The microcomputer then reads the bytes comprising the new instructions from the EPROM 28 and transfers them to high address memory in RAM 30. FIG. 6B illustrates the location in storage of the new instruction bytes, designated as replacement instructions in the exemplary RAM 30 memory map shown in FIG. 6B. As the next step, the microcomputer fetches from the EPROM 28 the two data bytes representing the RAM line address associated with the new instruction bytes just transferred to the RAM 30. the microcomputer then writes to the RAM 30, at the RAM line address just acquired, a jump instruction designated as Jump Instruction #1 in FIG. 6B. This jump instruction overwrites the last transferred function program page at the designated location. During the execution of the function program by the microcomputer, the jump instruction will instruct the microcomputer to jump to the corresponding replacement instructions and execute those instructions prior to proceeding any further in the function program. The last instruction in the replacement instructions is a second jump instruction, designated in FIG. 6B as Jump Instruction #2. The second jump instruction will instruct the microcomputer after execution of the replacement instructions to then jump to the appropriate location in the function program. FIG. 6B illustrates an example of how the second jump instruction may be implemented to cause the microcomputer to bypass certain of the original instructions in the function program. The bypassed instructions are designated as obsoleted instructions in FIG. 6B.

Once the first set of replacement instructions and the corresponding jump instructions have been stored in the RAM 30, the microcomputer still under the control of the executive program, accesses the next three-byte directory entry in the EPROM 28. If there is a match of the first entry byte which is the ROM 18 page number, the microcomputer transfers the corresponding replacement instructions and related jump instructions to the RAM 30 by the same process as previously described. If no match is found, the microcomputer continues to access the directory entries in the EPROM 28 looking for a ROM 18 page number match. The process is concluded when the directory is reached. The end of the directory will be determined by the microcomputer when the last two bytes in any three byte directory entry are found to both be equal to zero. It will be seen that if a directory entry is valid the last two bytes of the entry will not be zero since they will correspond to an address in the EPROM 28 which will be a non-zero high memory address where new instructions are stored.

Upon completion of the transfer from the ROM 18 to the RAM 30 of a page of function program instructions, and after transfer to the RAM 30 of all related new function program instructions and corresponding jump instructions, the microcomputer under control of the executive program will proceed to the next step. That is, the microcomputer will access the next page of function program instructions stored in the ROM 18 and the previously described process will be repeated in respect to that page. The microcomputer will continue to access new pages of function program instructions stored in the ROM 18 until ultimately the entire set of original function program instructions have been loaded into the RAM 30 together will all related new instructions from the EPROM 28 and corresponding jump instructions, to provide in the RAM 30 the instructions of the function program as revised to reflect all desired changes. The revised function program will now be ready for execution out of the RAM 30 by the central processing unit of the microcomputer.

It will thus be seen that function programs stored in the ROM 18 may be changed and revised as desired, and new resident function programs can be added for execution within the system 10, simply by programming, further programming or reprogramming the EPROM 28. Alternatively, these ends may be accomplished by replacement of the EPROM 28 by similar but differently programmed memory parts.

The following is an outline of the steps to be taken by the microcomputer under control of the exemplary executive program described above. It may be noted that steps 2, 3 and 8 are provided to reconcile timing discrepancies which can be expected when using the commercially available parts mentioned herein if the microcomputer is to be operated at high speed, i.e., at a 12 MHz clock frequency.

EXEMPLARY EXECUTIVE PROGRAM OUTLINE PAGE TRANSFER ROUTINE

Step 1

Execute a move instruction to move an HOA byte in the high order address latch in ROM 18. (For this operation, P2.3=0, P2.4=1, and P2.5=1.)

Step 2

Execute a move instruction to fetch the first data byte from ROM 18, but ignore the data byte acquired. (P2.3=0 and P2.4=1.)

Step 3

Execute four "no operations" to allow data accessed in step 2 to become valid in the data output register of ROM 18.

Step 4

Execute a move instruction to fetch the data byte from ROM 18 at last LOA used to access ROM 18, i.e., the LOA used in step 2 or step 8, the acquired data byte being regarded as now valid. (P2.3=0 and P2.4=1.)

Step 5

Compare the valid data byte acquired in step 4 with the symbol being used to indicate the end of the function program, e.g., EOF symbol. If there is a match, proceed to step 9 (correct routine). Otherwise, proceed to step 6.

Step 6

Execute a move instruction to move to low memory in RAM 30 the valid data acquired in step 4. (P2.3=1 and P2.4=1.)

Step 7

Compare the last LOA used to access the ROM 18 with 256 (a decimal number), i.e., compare the LOA used in step 4. If there is a match, proceed to step 9 (correct routine). Otherwise, proceed to step 8. A match indicates the end of the current function program page.

Step 8

Increment the LOA for ROM 18 and execute a move instruction to fetch the next data byte from ROM 18, but ignore the data byte acquired. (P2.3=0 and P2.4=1.) Proceed to step 3.

CORRECT ROUTINE

Step 9

Execute three move instructions to fetch three data bytes (1, 2 and 3) from EPROM 28 representing a directory entry in low memory in EPROM 28. (P2.3=1 and P2.4=0.) Byte 1=a ROM 18 HOA; Byte 2=an EPROM 28 LOA; and Byte 3=an EPROM 28 HOA.

Step 10

Compare Byte 2 and Byte 3 acquired in step 9 with 0 (a decimal number). If there is a match proceed to step 11. Otherwise, proceed to step 13. A match indicates the end of the directory in low memory in EPROM 18.

Step 11

Compare to determine if a match was found upon last execution of step 5 (indicating the end of the function program). If a match was found in step 5, proceed to step 19 (final routine). Otherwise, proceed to step 12.

Step 12

Increment the HOA for ROM 18 (to set up for the next page of function program), and proceed to step 1.

Step 13

Execute three move instructions to fetch three data bytes (A, B and C) from high memory in EPROM 28 using Byte 2 and Byte 3 acquired in step 9 as the LOA and HOA for the first data byte (Byte A) to be fetched. (P2.3=1 and P2.4=0.) Byte A=RAM 30 line LOA; Byte B=RAM 30 line HOA; and Byte C=#of new instructions in EPROM 28 for the current change.

Step 14

Increment the high memory address in EPROM 28 and execute a move instruction to fetch a data byte from EPROM 28 representing a new function program instruction. (P2.3=1 and P2.4=0.)

Step 15

Execute a move instruction to move to high memory in RAM 30 the data byte acquired in step 14. (P2.3=1 and P2.4=1.)

Step 16 Compare to determine if N data bytes have been moved by step 15 since the last execution of step 13, where N=Byte C (a binary number) acquired in step 13. If N bytes have been moved, proceed to step 14. Otherwise, proceed to step 15. If N bytes have been moved, it indicates that all new instructions representing the current function program change have been moved to the RAM 30.

Step 17

Execute move instructions to move to low memory in ROM 30 data bytes representing a jump instruction in the function program. (P2.3=1 and P2.4=1.) The beginning address in low memory in RAM 30 for the jump instruction is given by Byte A (LOA) and Byte C (HOA) acquired in step 13. The jump instruction calls for jump in the function program to high memory in RAM 30 at the beginning address of the new instructions representing the current function program change.

Step 18

Increment the low memory address in EPROM 28 and proceed to step 9.

FINAL ROUTINE

Step 19

(Optional) Execute the function program out of the RAM 30, as now revised and fully assembled in the RAM 30.

Step 20

Exit the executive program.

While a single embodiment of the invention has been described and illustrated herein in detail, it will be understood that the invention may be embodied and practiced in many forms. Accordingly, the invention is to be defined and limited only by the scope of the following claims.

What is claimed is:

1. In a memory patching system for a data processing system, a method comprising:

storing in a plurality of addressable storage locations of a first memory means, a first page of a first set of instructions of a computer program;

storing in a second memory means, a second set of instructions for revising said computer program, and a selected address of a storage location of the first page of the first instruction set stored in said first memory means identifying at least one instruction to be revised by said second set of instructions;

transferring to a third memory means, said first page of said first set of instructions into a first plurality of memory locations thereof equal to the plurality of memory locations of said first page;

comparing said selected address stored in said second memory means to the addresses of said storage locations in said first memory means of said first page of said first set of instructions transferred to said third memory means for identifying a revision location in said first plurality of memory locations of said third memory means;

transferring said second set of instructions to a second plurality of memory locations of said third memory means;

overwriting the instruction at said revision location in said first plurality of memory locations with a jump instruction for jumping to said second set of instructions in said second plurality of memory locations of said third memory means; and writing a second jump instruction at the end of said second set of instructions in said second plurality of memory locations in said third memory means for jumping back to the first set of instructions in said first plurality of memory locations in said third memory means such that a revision to the first set of instructions is effected.

* * * * *